(12) United States Patent
Yu et al.

(10) Patent No.: US 10,728,209 B2
(45) Date of Patent: Jul. 28, 2020

(54) SYSTEMS AND METHODS FOR RELATING CONFIGURATION DATA TO IP CAMERAS

(71) Applicant: Honeywell International Inc., Morristown, NJ (US)

(72) Inventors: Yunfeng Yu, Shanghai (CN); Wenbin Yan, Shanghai (CN); Zhenxing Guo, Shanghai (CN)

(73) Assignee: ADEMCO INC., Golden Valley, MN (US)

( * ) Notice: Subject to any disclaimer, the term of this patent is extended or adjusted under 35 U.S.C. 154(b) by 587 days.

(21) Appl. No.: 15/398,964

(22) Filed: Jan. 5, 2017

(65) Prior Publication Data

US 2018/0191668 A1     Jul. 5, 2018

(51) Int. Cl.
| | | |
|---|---|---|
| *H04L 29/12* | (2006.01) | |
| *H04W 4/02* | (2018.01) | |
| *H04L 29/06* | (2006.01) | |
| *H04M 1/725* | (2006.01) | |
| *H04N 7/18* | (2006.01) | |

(52) U.S. Cl.
CPC ...... *H04L 61/2015* (2013.01); *H04L 61/6022* (2013.01); *H04L 65/1073* (2013.01); *H04M 1/72519* (2013.01); *H04N 7/181* (2013.01); *H04W 4/025* (2013.01)

(58) Field of Classification Search
CPC ............. H04L 61/2015; H04L 61/6022; H04L 65/1073; H04N 7/181; H04W 4/025
See application file for complete search history.

(56) References Cited

U.S. PATENT DOCUMENTS

| | | | | |
|---|---|---|---|---|
| 6,323,897 B1* | 11/2001 | Kogane | ............ | G08B 13/19634 |
| | | | | 348/152 |
| 8,050,192 B2* | 11/2011 | Park | ............ | H04L 12/2803 |
| | | | | 370/254 |
| 9,706,178 B2* | 7/2017 | Carter | ............ | G07C 9/32 |
| 2004/0105005 A1* | 6/2004 | Yamamoto | ....... | G08B 13/19656 |
| | | | | 348/159 |

(Continued)

FOREIGN PATENT DOCUMENTS

WO     2006/060923 A1     6/2006

OTHER PUBLICATIONS

Extended European search report from EP patent application 17205639.2, dated May 30, 2018.

*Primary Examiner* — David P Zarka
(74) *Attorney, Agent, or Firm* — Husch Blackwell LLP

(57) ABSTRACT

Systems and methods for relating configuration data to IP cameras are provided. Some methods can include a video streaming server device receiving a message identifying an IP address of an IP camera from a DHCP server device, the video streaming server device using the IP address to connect to the camera, the video streaming server device receiving a video data stream from the camera, the video streaming server device extracting a MAC address of the camera from a connection with the IP camera, the video streaming server device transmitting the video data stream, the IP address, and the MAC address to a mobile device, a manager server device receiving configuration information for the IP camera, the IP address, and the MAC address from the mobile device, and the manager server device relating and binding the configuration information with the IP address and the MAC address.

16 Claims, 2 Drawing Sheets

(56) References Cited

U.S. PATENT DOCUMENTS

| | | | |
|---|---|---|---|
| 2004/0175123 A1* | 9/2004 | Lim | H04N 5/77 386/223 |
| 2005/0010649 A1* | 1/2005 | Payne | G08B 13/19656 709/217 |
| 2005/0152287 A1* | 7/2005 | Yokomitsu | H04L 29/06027 370/255 |
| 2006/0161960 A1* | 7/2006 | Benoit | G08B 13/19656 725/105 |
| 2007/0005156 A1* | 1/2007 | Moinvaziri | G05B 19/4183 700/56 |
| 2007/0200914 A1* | 8/2007 | DuMas | G08B 13/19645 348/14.01 |
| 2008/0170566 A1* | 7/2008 | Akimoto | H04L 61/2015 370/389 |
| 2009/0245268 A1* | 10/2009 | Pugliese, IV | H04L 12/10 370/401 |
| 2009/0323556 A1* | 12/2009 | Liu | H04L 29/12301 370/255 |
| 2010/0002082 A1* | 1/2010 | Buehler | G08B 13/19645 348/159 |
| 2010/0097473 A1* | 4/2010 | Park | H04N 5/23203 348/159 |
| 2011/0093600 A1* | 4/2011 | Lee | H04W 48/18 709/228 |
| 2011/0231526 A1* | 9/2011 | Hsieh | H04L 29/12283 709/220 |
| 2013/0258119 A1* | 10/2013 | Kim | H04L 61/2514 348/207.1 |
| 2014/0281478 A1* | 9/2014 | Huang | H04W 4/50 713/150 |
| 2014/0281990 A1* | 9/2014 | Gu | G08B 13/19684 715/719 |
| 2015/0208111 A1* | 7/2015 | Jung | H04N 21/2743 725/92 |
| 2015/0293877 A1* | 10/2015 | Liang | A61B 1/00016 710/33 |
| 2015/0373538 A1* | 12/2015 | Huang | H04N 7/181 726/5 |
| 2016/0210133 A1* | 7/2016 | Lee | G06F 8/65 |
| 2016/0232764 A1* | 8/2016 | Galvin | H04N 21/4143 |
| 2016/0316178 A1* | 10/2016 | Hoeffner | H04N 7/183 |
| 2016/0359928 A1* | 12/2016 | Lee | H04L 65/1073 |
| 2017/0347133 A1* | 11/2017 | Wang | H04W 4/70 |

* cited by examiner

SYSTEMS AND METHODS FOR RELATING CONFIGURATION DATA TO IP CAMERAS

FIELD

The present invention relates generally to configuring Internet Protocol (IP) cameras. More particularly, the present invention relates to systems and methods for relating configuration data to IP cameras.

BACKGROUND

When installing large scale surveillance systems, it is necessary to configure and dispose a plurality of cameras. For example, each of the plurality of cameras is assigned an IP address, each of the plurality of cameras is assigned a camera name, and the assigned camera name is related to the assigned IP address for each of the plurality of cameras.

However, when a surveillance system includes a large number of cameras, it can be difficult to configure the cameras as described above. Furthermore, it can be difficult to determine the correct way to dispose each of the plurality of cameras in the system.

In view of the above, there is a continuing, ongoing need for improved systems and methods.

DETAILED DESCRIPTION

Figure 1:
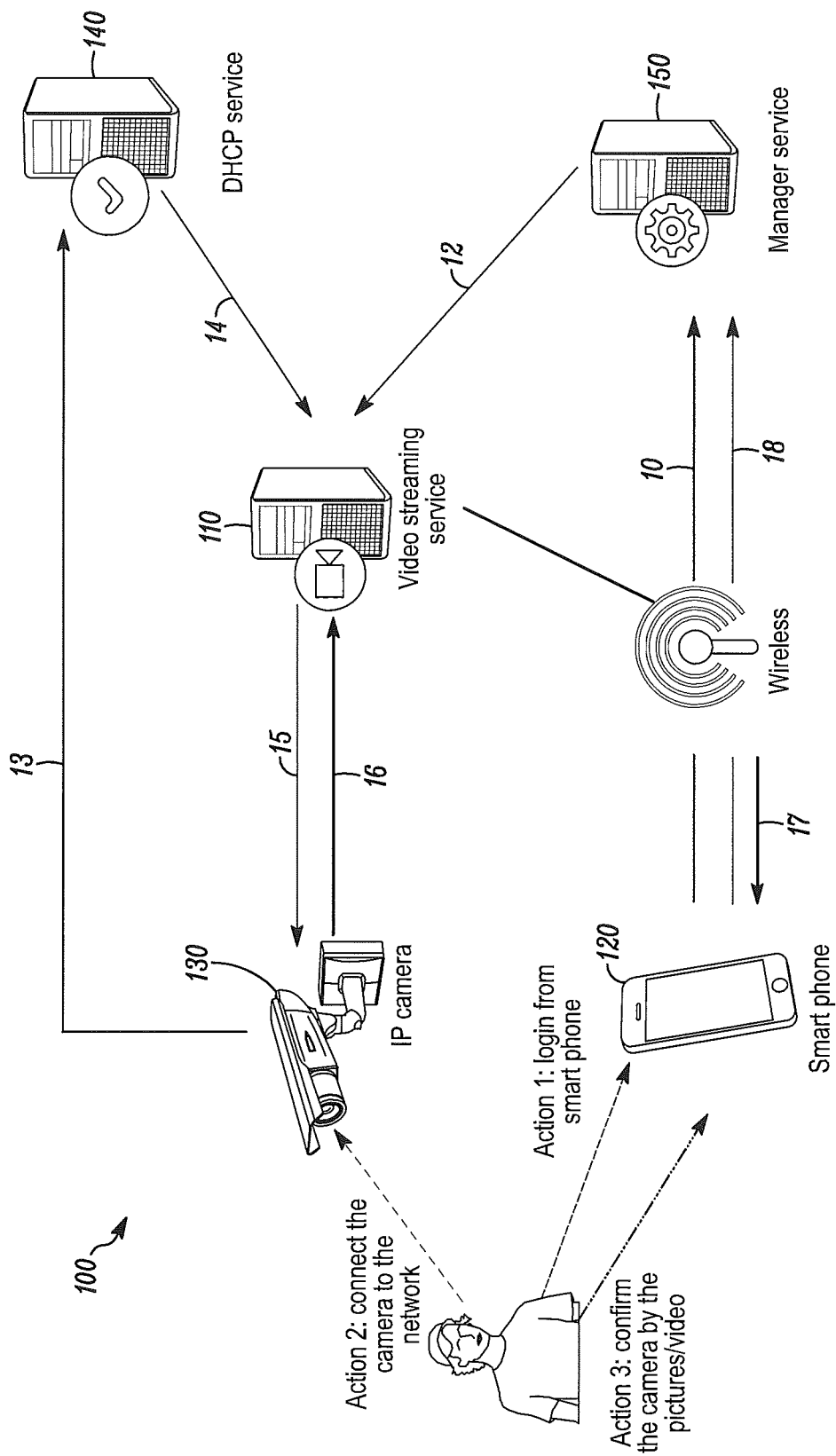
FIG. 1 is a schematic diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for relating configuration data to IP cameras. For example, some systems and methods disclosed herein can facilitate quickly and easily configuring and disposing a plurality of cameras in a large scale surveillance system.

It is known to use a Dynamic Host Configuration Protocol (DHCP) service in connection with IP cameras. Accordingly, in some embodiments disclosed herein, systems and methods can use a DHCP service to detect when a new device, such as an IP camera, has been powered up, plugged in, or installed into a surveillance system. Furthermore, in some embodiments disclosed herein, systems and methods can use a DHCP service to automatically assign an IP address to a new IP camera. Advantageously, because the IP address of the IP camera is assigned automatically, there is no need to manually assign the IP address to a camera, thereby reducing errors.

In some embodiments, systems and methods disclosed herein can also identify a media access control (MAC) address of a new IP camera, for example, when the camera has been powered up, plugged in, or installed into a surveillance system. In some embodiments, systems and methods disclosed herein can extract the MAC address assigned to the new IP camera from a Transmission Control Protocol/Internet Protocol (TCP/IP) connection with the new IP camera.

In some embodiments, a multimedia streaming service can receive a notification message identifying the assigned IP address and the MAC address of the new IP camera and can use the IP address and the MAC access to attempt to access the new IP camera. In some embodiments, when the streaming service successfully accesses the new IP camera, systems and methods disclosed herein can include delivering real time video or pictures captured by the new IP camera to the mobile device of a user installing and disposing the camera. For example, the mobile device can include, but is not limited to, a cellular phone, a personal digital assistant, a tablet computer, and the like.

In some embodiments, the mobile device of the user installing and disposing the camera can display a list of camera names and the real time video or pictures captured by the new IP camera. The user can provide user input to the mobile device to select a camera name from the list of camera names, thereby assigning and confirming the selected camera name to the new IP camera. In some embodiments, systems and methods disclosed herein can also identify GPS coordinate data generated by the mobile device and associate and save the identified GPS coordinate data with the new IP camera. In these embodiments, systems and methods disclosed herein can operate under the assumption that the mobile device is within a predetermined distance of the new IP camera.

In some embodiments, systems and methods disclosed herein can relate the selected camera name and any other configuration data of the new IP camera, such as the GPS coordinate data of a mobile device within a predetermined distance of the new IP camera that has been associated with the new IP camera, with the IP address and the MAC address of the camera. In some embodiments, the relationship of the selected camera name and other configuration data of the new IP camera with the IP address and the MAC address of the IP camera can be a persistent relationship. That is, because the new IP camera, including the IP address and the MAC address of the camera, binds with the assigned name and other configuration data during installation and commissioning of the camera, time spent during installation and commissioning can be reduced.

FIG. 1 is a schematic diagram of a system 100 in accordance with disclosed embodiments. As seen in FIG. 1, the system 100 can include a video streaming server device 110 in wired or wireless communication with each of a mobile device 120, an IP camera 130, a DHCP server device 140, and a manager server device 150.

In some embodiments, a user can log in to the manager server device 150 by providing log in information to the mobile device 120 and the mobile device 120 wirelessly transmitting the log in information to the manager server device 150 as in 10. Then, the manager server device 150 can transmit the log in information received from the mobile device 120 to the video streaming server device 110 to register the mobile device 120 with the video streaming server 110 as in 12. In some embodiments, after the mobile device 120 is registered with the video streaming server device 110, the manager server device 150 can download a list of names of IP cameras to the mobile device 120.

Separately, when the IP camera 130 is connected to the network of the system 100, the IP camera 130 can transmit a request to the DHCP server device 140 to assign and allocate an IP address to the camera 130 as in 13. Responsive to receiving the request from the camera 130, the DHCP server device 140 can assign an IP address to the camera 130 and transmit a notification to the video streaming server device 110 identifying the IP address assigned to the camera 130 as in 14. Then, the video streaming server device 110 can use the IP address of the camera 130 to attempt to access or connect with the camera 130 as in 15. Upon successfully accessing or connecting with the camera 130, the video streaming server device 110 can receive from the camera 130 images and/or video data streams captured by the camera 130 as in 16 and transmit the received images and/or video data streams, the IP address of the camera 130, and a MAC address of the camera 130 to the mobile device 120 that previously registered with the video streaming server device 110 as in 17. For example, in some embodiments, the video streaming server device 110 can extract the MAC address of the camera 130 from a TCP/IP connection with the camera 130.

The mobile device 120 can display the received images and/or video data streams and receive user input to select a camera name to be associated with the camera 130 that captured the displayed images and/or video data streams. For example, in some embodiments, the mobile device 120 can display the list of names of IP cameras previously received from the manager server device 150, and the user can select the camera name from the displayed list. Then, the mobile device 120 can transmit the configured camera name, the IP address of the camera 130, and the MAC address of the camera 130 to the manager server device 150 for relating and binding the configured camera name, that is, the configuration data, with the IP address and MAC address of the camera 130 as in 18.

In some embodiments, it can be assumed that the mobile device 120 is within a predetermined distance of the IP camera 130. In these embodiments, the camera 130 can be tagged with the GPS coordinate data of the mobile device 120 such that the GPS coordinate data of the mobile device 120 can be considered additional configuration data of the camera 130. Accordingly, the mobile device 120 can also transmit its GPS coordinate data to the manager server device 150 for relating and binding the configured camera name and the GPS coordinate data, that is, the configuration data, with the IP address and MAC address of the camera 130.

As explained above, the relationship of the configuration data of the camera 130 with the IP address and MAC address of the camera 130 can be a persistent relationship. Accordingly, even when power to the system 100 is lost and subsequently recovered, or when the IP address of the camera 130 is reassigned by the DHCP server device 140, the mapped relationship of the configuration data of the camera 130 with the camera 130 itself can be rebuilt using the MAC address of the camera 130.

Figure 2:
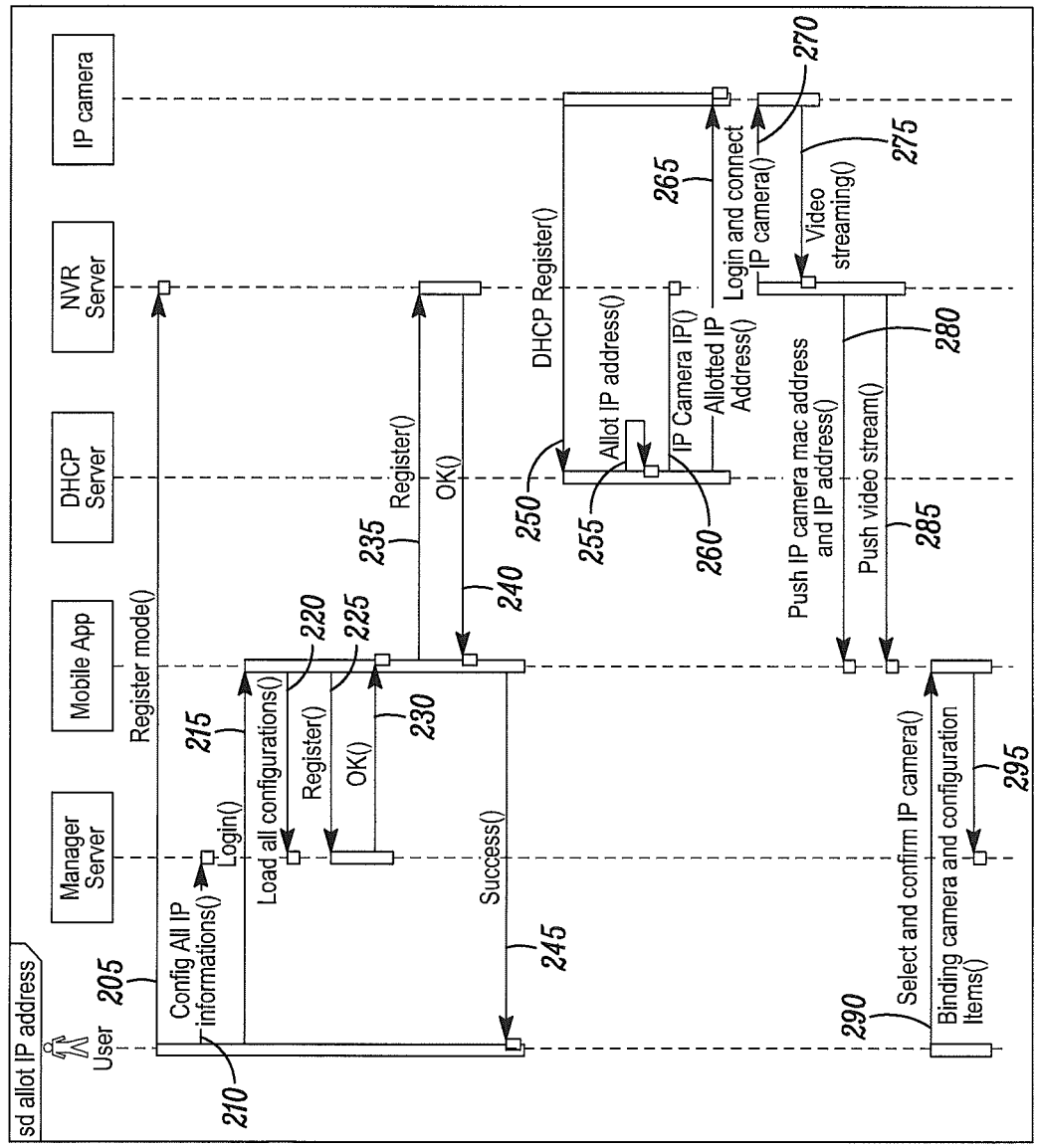
FIG. 2 is a flow diagram of a method in accordance with disclosed embodiments.

FIG. 2 is a flow diagram of a method 200 in accordance with disclosed embodiments. As seen in FIG. 2, the method 200 can include a user providing input to a network video recorder (NVR) server device to place the NVR server device into a registration mode as in 205, the user configuring all IP information for a surveillance system in a manager server device as in 210, and the user entering log in information to a mobile software application executing on a mobile device as in 215. Then, the method 200 can include the mobile software application executing on the mobile device transmitting all configurations loaded onto the mobile device to the manager server device as in 220, and the mobile device transmitting the received log in information to the manager server device as in 225. Responsive thereto, the manager server device can transmit a confirmation message to the mobile device as in 230, and the mobile device can transmit a registration message to the NVR server device as in 235. Responsive thereto, the NVR server device can transmit a confirmation message to the mobile device as in 240, which can display a message indicating successful registration to the user as in 245.

As also seen in FIG. 2, the method 200 can also include an IP camera transmitting a registration message to a DHCP server device as in 250. Responsive thereto, the DHCP server device can allocate an IP address to the IP camera as in 255, transmit the allocated IP address to the NVR server device as in 260, and transmit the allocated IP address to the IP camera as in 265. Then, the NVR server device can connect to the IP camera as in 270, and, when the connection is successful, the IP camera can stream video to the NVR server device as in 275. The NVR server device can push the MAC address and the IP address of the camera to the mobile software application executing on the mobile device as in 280 and can push the streamed video to the mobile software application executing on the mobile device as in 285. Responsive to a display on the mobile device, the user can provide input to the mobile device to select and confirm a name of the camera as in 290, and the mobile software application executing on the mobile device can transmit such received configuration data of the camera, that is, the selected name of the camera, and the MAC address and IP address of the camera to the manager server device to bind the configuration data of the camera to the MAC address and IP address of the camera as in 295.

It is to be understood that the services, servers, and server devices as disclosed and described above can include control circuitry, one or more programmable processors, and executable control software stored on a non-transitory computer readable medium, including, but not limited to local computer memory, RAM, optical storage media, magnetic storage media, flash memory, and the like. In some embodiments, some or all of the control circuitry, programmable processors, and control software of the services, servers, and server devices disclosed and described above can execute and control at least some of the methods described above.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:
1. A method comprising:
receiving a message identifying an internet protocol (IP) address of an IP camera at a video streaming server device from a Dynamic Host Configuration Protocol (DHCP) server device, wherein the IP address is assigned to the IP camera by the DHCP server device;
using the IP address of the IP camera to establish a connection between the video streaming server device and the IP camera;

receiving a video data stream at the video streaming server device from the IP camera via the connection;

extracting, by the video streaming server device, a media access control (MAC) address of the IP camera from the connection;

receiving, log in information at the video streaming server device or a manager server device from a mobile device to register the mobile device with the video streaming server device;

after the mobile device is registered with the video streaming server device, transmitting the video data stream, the IP address of the IP camera, and the MAC address of the IP camera from the video streaming server device to the mobile device;

responsive to the mobile device receiving the video data stream, the IP address of the IP camera, and the MAC address of the IP camera, receiving configuration information of the IP camera, the IP address of the IP camera, and the MAC address of the IP camera at the manager server device from the mobile device; and relating and binding, by the manager server device, the configuration information of the IP camera with the IP address of the IP camera and the MAC address of the IP camera.

2. The method of claim 1 further comprising:

responsive to the DHCP server device identifying the IP camera connecting to the network, assigning, by the DHCP server device, the IP address to the IP camera.

3. The method of claim 1 further comprising:

responsive to displaying the video data stream on the mobile device, receiving or identifying the configuration information of the IP camera at or on the mobile device.

4. The method of claim 3 further comprising:

receiving user input identifying a name of the IP camera at the mobile device, wherein the configuration information of the IP camera includes the name of the IP camera identified by the user input.

5. The method of claim 4 further comprising:

displaying a list of camera names on the mobile device; and receiving the user input identifying the name of the IP camera from the list of camera names.

6. The method of claim 5 further comprising:

downloading the list of camera names from the manager server to the mobile device.

7. The method of claim 3 further comprising:

identifying GPS coordinate data of the mobile device, wherein the configuration information of the IP camera includes the GPS coordinate data of the mobile device.

8. The method of claim 1 wherein the manager server device relating and binding the configuration information of the IP camera with the IP address of the IP camera and the MAC address of the IP camera creates a persistent relationship between the configuration information of the IP camera, the IP address of the IP camera, and the MAC address of the IP camera.

9. A system comprising:

a video streaming server device; and a manager server device, wherein the video streaming server device receives a message identifying an internet protocol (IP) address of an IP camera that a Dynamic Host Configuration Protocol (DHCP) server device assigned to the IP camera, wherein the video streaming server device uses the IP address of the IP camera to establish a connection between the video streaming server device and the IP camera, wherein the video streaming server device receives a video data stream from the IP camera via the connection, wherein the video streaming server device extracts a MAC address of the IP camera from the connection, wherein the video streaming server device or the manager server device receives log in information from a mobile device to register the mobile device with the video streaming server device, wherein, after the mobile device is registered with the video streaming server device, the video streaming server device transmits, the video data stream to the mobile device, wherein, responsive to the mobile device receiving the video data stream, the manager server device receives configuration information of the IP camera from the mobile device, and wherein the manager server device relates and binds the configuration information of the IP camera with the IP address of the IP camera and the MAC address of the IP camera.

10. The system of claim 9 wherein, responsive to the DHCP server device identifying the IP camera connecting to the network, the DHCP server device assigns the IP address to the IP camera.

11. The system of claim 9 wherein the mobile device displays the video data stream, and wherein the mobile device receives or identifies the configuration information of the IP camera.

12. The system of claim 11 wherein the mobile device receives user input identifying a name of the IP camera, and wherein the configuration information of the IP camera includes the name of the IP camera identified by the user input.

13. The system of claim 12 wherein the mobile device displays a list of camera names, and wherein the mobile device receives the user input identifying the name of the IP camera from the list of camera names.

14. The system of claim 12 wherein the manager server device downloads the list of camera names to the mobile device via the transceiver device.

15. The system of claim 9 wherein the manager server device relates and binds the configuration information of the IP camera with the IP address of the IP camera and the MAC address of the IP camera to create a persistent relationship between the configuration information of the IP camera, the IP address of the IP camera, and the MAC address of the IP camera.

16. A system comprising:

a transceiver device;

a programmable processor, and executable control software stored on a non-transitory computer readable medium, wherein the programmable processor and the executable control software receive a message identifying an Internet Protocol (IP) address of an IP camera via the transceiver device, wherein the IP address is assigned to the IP camera by a Dynamic Host Configuration Protocol (DHCP) server device, wherein the programmable processor and the executable control software use the IP address of the IP camera to establish a connection between the transceiver device and the IP camera, wherein the programmable processor and the executable control software receive a video data stream from the IP camera via the connection, wherein the programmable processor and the executable control software extract a MAC address of the IP camera from the connection, wherein the programmable processor and the executable control software transmit, to a mobile device and via the transceiver device, the video data stream, wherein the programmable processor and the executable control software receive configuration information of the IP camera from the mobile device via the transceiver device, wherein the configuration information of the IP camera includes GPS coordinate data of the mobile device, and wherein the programmable processor and the executable control software relate and hind the configuration information of the IP camera with the IP address of the IP camera and the MAC address of the IP camera.

* * * * *

UNITED STATES PATENT AND TRADEMARK OFFICE
CERTIFICATE OF CORRECTION

PATENT NO. : 10,728,209 B2
APPLICATION NO. : 15/398964
DATED : July 28, 2020
INVENTOR(S) : Yunfeng Yu, Wenbin Yan and Zhenxing Guo Page 1 of 1

It is certified that error appears in the above-identified patent and that said Letters Patent is hereby corrected as shown below:

In the Claims

In Column 5, Claim 1, Line 6, delete "," following "receiving"
In Column 6, Claim 9, Line 16, delete "," following "transmits"

Signed and Sealed this
Seventeenth Day of November, 2020

Andrei Iancu
*Director of the United States Patent and Trademark Office*